K. R. DIETERLE.
FILM WINDER.
APPLICATION FILED JULY 29, 1915.
1,195,447.  Patented Aug. 22, 1916.
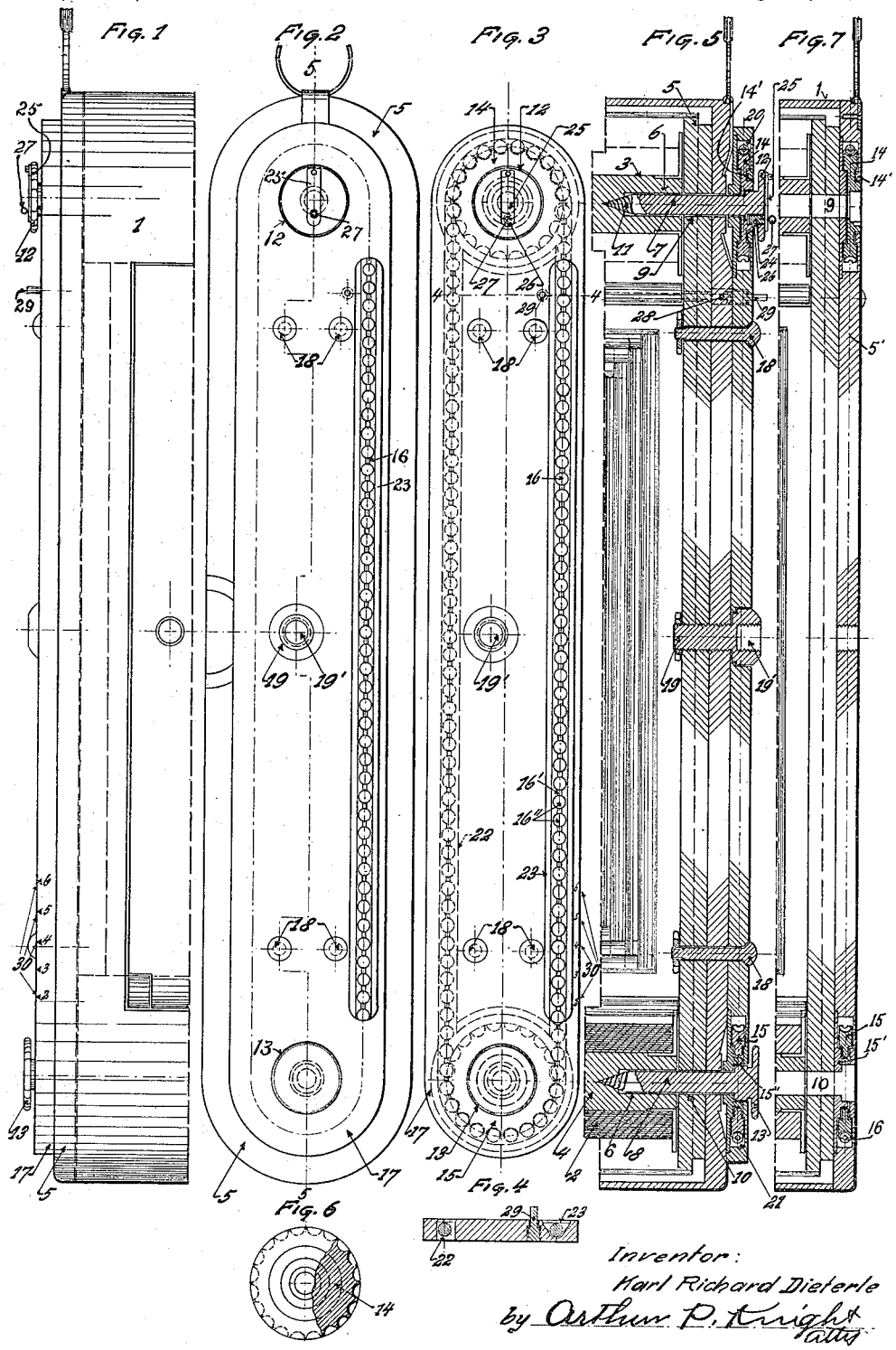
Inventor:
Karl Richard Dieterle
by Arthur P. Knight
Atty

UNITED STATES PATENT OFFICE.

KARL RICHARD DIETERLE, OF LOS ANGELES, CALIFORNIA.

FILM-WINDER.

1,195,447.     Specification of Letters Patent.     Patented Aug. 22, 1916.

Application filed July 29, 1915. Serial No. 42,496.

*To all whom it may concern:*

Be it known that I, KARL RICHARD DIETERLE, a subject of the Emperor of Austria-Hungary, and a resident of Los Angeles, in the county of Los Angeles and State of California, have invented a new and useful Film-Winder, of which the following is a specification.

This invention relates to means for winding the film of a camera from one roll to another, in order to bring a new film portion into position for exposure, and the main object of the invention is to provide means whereby this operation may be performed more easily and quickly by the operator than is possible with the usual film winding means such as rotatable keys.

Another object of the invention is to enable a film to be moved so as to bring it to position for a new exposure by a single stroke or movement of the operator's hand.

A further object of the invention is to provide a film winding means such as above described which is attachable to cameras provided with rotary operating means for the film rolls.

The accompanying drawings illustrate embodiments of my invention and referring thereto:

Figure 1 is a front elevation of a portion of a camera, showing my film winder attached thereto. Fig. 2 is a side elevation thereof. Fig. 3 is a side elevation of the film winder detached from the camera. Fig. 4 is a section on line 4—4 in Fig. 3. Fig. 5 is a section on line 5—5 in Fig. 2. Fig. 6 is a side elevation, partly broken away, of one of the sprocket wheels for the operating mechanism. Fig. 7 is a vertical section of a modified form of the invention, wherein the film winding means is constructed as a part of the camera.

1 designates the casing of a camera, which may be of any usual or suitable type, adapted for exposure of a film 2, wound on rolls 3 and 4, said rolls being detachably mounted in the casing 1. In place of the usual pins or spindles which extend through the side member of the casing 1 and engage the recesses 6 in the rolls 3 and 4 to support and drive the same, I provide pins 7 and 8, which extend through holes 9 and 10 in the side piece 5 and into the sockets or recesses 6 in the rolls 3 and 4, said pins 7 and 8 being provided with screw portions 11 at their inner ends whereby they may be engaged with the rolls so as to turn the rolls by operation of said pins. These pins or shafts 7 and 8 are provided respectively with knurled head or handle portions 12 and 13 at their outer ends for rotation thereof. Sprocket wheels 14 and 15 are mounted in bearings 14' and 15' to turn around shafts 7 and 8 respectively, said wheels carrying a sprocket chain or flexible member 16 which serves as the operating means for the film winding mechanism. Said operating means is preferably housed in a plate or member 17 detachably fastened to the camera casing 1 by screws 18 and 19. Screw 19 may be provided with a screw socket 19' to enable the camera to be mounted in the usual manner on a tripod. The housing plate or member 17 is provided with recesses 20 and 21 for receiving the wheels 14 and 15, and with channels 22 and 23 for the chain 16, the channel 23 for one run of the chain being open so as to expose that portion of the chain, and being shaped so that the tip of a finger of the operator may be inserted therein so as to engage suitable projections on the chain or flexible member, consisting, for example or balls 16" on a continuous cord or wire member 16', said projections constituting fingerholds distributed throughout the length of the endless flexible member and also serving as means for engaging the teeth of the sprocket wheels 14 and 15 to turn the latter. With the exception of the operating heads 12 and 13, and the exposed portion of the flexible member 16, the parts of the film winding mechanism are completely inclosed by the housing 17.

Wheel 14 is releasably connected with its shaft or pin 7 by clutch means comprising, for example, a pin 24 carried by a spring 25 secured to head 12, said pin extending through a hole in said head and into a socket 26 in wheel 12, so that under normal conditions rotation of wheel 14 causes rotation of head 12, and of shaft 7 and roll 3, connected therewith. A knob or handle 27 is provided on pin 24 whereby it may be withdrawn from socket 26 so as to temporarily release the wheel 14 from connection with the roll 3. This clutch enables the shaft 7 to be screwed into the wood, and then to be quickly clutched to wheel 14 by snapping pin 24 into socket 26. A button 29 is mounted to slide in the housing plate 17, to engage the usual push button 28 for releasing the camera door to permit the camera to be opened in the usual manner.

The operation is as follows: A roll 4, carrying the film 2 is placed in position and secured by screwing the end of pin or shaft 8 thereinto, and the empty roll just used is placed in position at the top of the casing and secured by screwing pin or shaft 7 thereinto. The camera is then closed and when it is desired to bring a film portion into position for exposure, the operator places a finger in the groove or open channel 23 so as to engage one of the balls or projections 16″ on flexible member 16 and draws such finger down so as to move said flexible member and turn the wheel 14, winding the film on the upper roll to the extent required to bring the desired film portion into position. In this operation he may have to move the chain several times in order to bring the film into position for the first exposure, but after that a single movement of the flexible member may suffice to advance the film sufficiently for a new exposure, the open portion of the channel being of sufficient length to provide for such movement. In determining the amount of movement necessary the operator may watch for the film numbers exposed through the usual window in the back of the casing, or he may be guided by suitable marks, indicated at 30 on the member 17, said marks indicating the position to which the finger should be moved from the top of the channel, to bring any desired portion of the film into position, it being understood that, on account of winding of the film on roll 3, with resultant gradual increase in diameter thereof, the movement of the flexible member required to produce a given movement of the film will gradually decrease for successive films, as indicated by the position of the stop marks 30. In case the film is moved too far, it may be moved back by turning head 13, so as to wind the film back onto roll 4.

If desired, the film winding mechanism above described may be built into a side piece 5 of the camera, as shown in Fig. 7, which shows the mounting of the wheels 14 and 15 and flexible member 16 within the said side piece, the roll engaging pins or shafts being omitted from this figure. The construction and operation of the parts in this case is the same as above described.

What I claim is:

1. A film winder for cameras, comprising a casing member having a slot, an endless flexible member exposed at said slot for manual operation and provided with finger-holds distributed throughout its length, and film winding means connected to be operated by said flexible member.

2. A film winder for cameras, comprising rotatable members adapted to wind the film, an endless flexible member mounted to rotate one of said rotatable members and provided with finger-holds distributed throughout its length, and inclosing means having a slot exposing the finger-holds of a portion of said endless flexible member for manual operation thereof.

3. A film winder for cameras, comprising rotatable members adapted to engage the film rolls to wind the film and provided with independent handle means, wheels rotatably mounted on said rotatable members, one of said wheels having a clutch connection with the rotatable member on which it is mounted, an endless flexible member mounted on said wheels and provided with finger-holds distributed throughout its length, and a casing member inclosing said wheels and provided with a slot exposing the finger-holds of a portion of said flexible member for manual operation thereof.

4. In combination with a film roll of a camera, a sprocket wheel connected to operate said roll, and an endless flexible member mounted on said sprocket wheel and having projections distributed throughout its length, said projections being adapted to engage the sprocket wheel and constituting finger-holds, said endless flexible member having a portion exposed for manual operation.

5. As an attachment for cameras, a casing member provided with means for attachment to a camera, a shaft mounted in said casing member and provided with means for engaging one of the film rolls of the camera, a wheel mounted on and connected to said shaft, a second wheel mounted on said casing member, and a flexible member mounted on said wheels to operate the first named wheel and provided with finger-holds distributed throughout its length, said casing member having a slot exposing a portion of said flexible member for manual operation thereof.

6. A film winder for cameras, comprising rotatable members adapted to rotate the film carrying rolls, a wheel connected to one of said members to rotate the same, a second wheel, an endless flexible member mounted on said wheels and provided with projections, and a housing covering the aforesaid parts, and provided with channels for said flexible member, a portion of one of said channels being open to expose a portion of said flexible member for operation thereof.

7. A film winder for cameras, comprising rotatable members adapted to rotate the film carrying rolls, a wheel connected to one of said members, an endless flexible member engaging said wheel to rotate the same by a longitudinal movement of said flexible member, a housing inclosing the aforesaid parts and provided with an open channel exposing a portion of said flexible member for manual operation thereof, and manual operating means external to said housing and connected to said rotatable members for direct operation thereof.

In testimony whereof I have hereunto set my hand, at Los Angeles, California, this 23rd day of July 1915.

KARL RICHARD DIETERLE.